United States Patent [19]
Kobayashi et al.

[11] Patent Number: 6,150,484
[45] Date of Patent: Nov. 21, 2000

[54] PROCESS FOR PRODUCING POLYVINYL CHLORIDE PASTE BLENDING RESIN

[75] Inventors: Teiji Kobayashi, Sakai; Taizou Yamamoto, Kakogawa; Masahiro Kubo; Taizou Koike, both of Settsu, all of Japan

[73] Assignee: Kaneka Corporation, Osaka, Japan

[21] Appl. No.: 09/033,567

[22] Filed: Mar. 2, 1998

[30] Foreign Application Priority Data

Mar. 17, 1997 [JP] Japan ................................. 9-084395

[51] Int. Cl.⁷ ........................................... C08F 2/20
[52] U.S. Cl. ......................... 526/200; 526/202; 526/213; 526/215
[58] Field of Search ................... 326/200, 202, 326/213, 215

[56] References Cited

U.S. PATENT DOCUMENTS

| | | | |
|---|---|---|---|
| 4,319,012 | 3/1982 | Morningstar | 526/202 |
| 4,404,339 | 9/1983 | Bush et al. | 526/88 |
| 5,089,575 | 2/1992 | Arima et al. | 526/200 |
| 5,204,421 | 4/1993 | Amano et al. | 526/200 |
| 5,849,840 | 12/1998 | Maruhashi et al. | 525/56 |
| 5,883,209 | 3/1999 | Nakano et al. | 526/200 |

*Primary Examiner*—Ana Woodward
*Attorney, Agent, or Firm*—Pollock, Vande Sande & Amernick

[57] ABSTRACT

The present invention is a process for producing a polyvinyl chloride paste blending resin comprising polymerizing a vinyl chloride-based monomer by a suspension polymerization in an aqueous medium, wherein as a suspending agent, both (A) and (B) are used in a mixing weight ratio (A)/(B) of 99/1 to 50/50, and a total amount of said (A) and said (B) is 0.1 to 1.0 part by weight based on 100 parts by weight of the vinyl chloride-based monomer, said (A) being a partially hydrolyzed water-soluble poly(vinyl alcohol) having a viscosity at 20° C. of 4% aqueous solution by weight of 20 to 110 cps and the degree of hydrolysis of 86 to 99 mol %, and said (B) being a partially hydrolyzed water-soluble poly(vinyl alcohol) having a viscosity at 20° C. of 4% aqueous solution by weight of 5 to 10 cps and the degree of hydrolysis of 70 to 80 mol %.

6 Claims, No Drawings

PROCESS FOR PRODUCING POLYVINYL CHLORIDE PASTE BLENDING RESIN

FIELD OF THE INVENTION

This invention relates to a suspension polymerization process for polymerizing a vinyl chloride monomer or a mixture of a vinyl chloride monomer and a monomer copolymerizable therewith (hereinafter, referred to as a vinyl chloride-based monomer). In more details, this invention relates to a process for producing a polyvinyl chloride paste blending resin, which is suitable for mixing with a polyvinyl chloride paste resin and then, adding a plasticizer thereto to make a pastisol and an organosol, and whose waste-water treatment in the production process is easy and a quality of waste-water after the treatment is good.

PRIOR ART

A polyvinyl chloride paste resin (hereinafter, referred to as a paste resin) is obtained by a process comprising kneading with compounding ingredients such as a plasticizer, a diluent, a stabilizer, a filler and the like to thereby give a plastisol and an organosol (hereinafter, referred to as a sol), and molding thus-obtained sol by such a method as dipping, slush, rotation or coating, followed by heating it for gelation and fusion. A moldability in this process is influenced largely by a flowability of the sol, and particularly in coating method, a paste blending resin (hereinafter, referred to as a paste blending resin) is used together in order to reduce a viscosity of a sol and to improve flowability.

Generally, a paste resins is produced by a microsuspension polymerization or an emulsion polymerization. By the former process, a particle diameter of a paste resin usually shows a polydisperse-type distribution between 0.1 and 3 $\mu$m, while by the latter process, a particle diameter of a paste resin usually shows several monodisperse-type distribution between 0.1 and 3 $\mu$m.

On the other hand, a paste blending resin used as an improving agent for flowability of a sol has a particle diameter ranging from 20 to 60 $\mu$m, which is larger than that of a paste resin and is smaller than that of an usual polyvinyl chloride resin (hereinafter, referred to as PVC resin) having a particle diameter ranging from 100 to 200 $\mu$m. It is desirable that a shape of the paste blending resin particle is a low porosity, uniform spherical glassy bead having the smooth surface and that is has an appropriate affinity with a plasticizer and that articles molded by heating have excellent mechanical properties. For producing the paste blending resin, a suspension polymerization process for polymerizing a vinyl chloride-based monomer is usually applied.

It is desirable that a quantity of coarse particles in a paste blending resin is as small as possible, because the paste blending resin is used as a part of a paste sol. Thus it is required to lower a production of coarse particles both in steps of polymerization and in steps of dehydration and drying of a slurry after polymerization.

Thus, in order to obtain a paste blending resin having a small particle diameter, it is needed to sue a larger quantity of a suspending agent in suspension polymerization, compared with a process for producing an usual PVC resin, and therefore, it is the actual condition that a quality of waste-water from a polymerization step for a paste blending resin is very poor compared with that of an usual PVC resin.

On the other hand, a quality of waste-water has recently been regulated not only by a biochemical oxygen demand (BOD) but also by a chemical oxygen demand (COD). Since a waste-water, the BOD value of which is in the range of the regulation but which is difficult to be biologically decomposed, has largely been highlighted, a technically and economically appropriate treatment for waste-water before a discharge is required in order to meet with these environmental regulations.

Various processes for producing a paste blending resin have been proposed, but generally used is a process which comprises polymerizing with aid of a mechanical dispersion force or combined use thereof with an emulsifier, copolymerizing a particular monomer, adding a particular compound using a water-soluble polymer as a suspending agent. For example, there are proposed a process comprising performing a suspension polymerization by using a water-soluble protein (gelatin etc.) as a suspending agent and treating a polymer obtained thereby by a protease (Japanese Kokai Publication Sho-55-145709); a process comprising using gelatin and polyvinylpyrolidone as suspending agents (Japanese Kokai Publication Sho-56-88406); a process comprising polymerizing in the presence of a cellulose-type suspending agent and treating the obtained polymer with cellulase (Japanese Kokai Publication Sho-57-98504); a process comprising performing a polymerization in the presence of ethylene/vinyl acetate copolymer by using a cellulose-type suspending agent (Japanese Kokai Publication Sho-58-103513) and the like.

However, in the process of using a water-soluble protein such as a gelatin as a suspending agent, the water-soluble protein is a natural substance and a stability in a polymerization step and a quality is largely variable, and further a polymer obtained needs to be treated with a protease in order to sustain mechanical properties of the product molded by heating and this treatment makes a cost of its production high. In the process of using polyvinylpyrolydone as a suspending agent, mechanical properties of a product molded by heating is good, but it is needed that a large amount of polyvinylpyrolydone must be added in order to get particles having a small diameter between 20 and 80 $\mu$m and a high price of polyvinylprolydone causes a high cost of its production to be high. Further, there are no appropriate treating methods for its waste-water. In the process of using a cellulose-type suspending agent, there are no appropriate methods by which the cellulose-type suspending agent dissolved in a waste-water coming from polymerization can be treated economically. As mentioned above, every conventional method has both merits and demerits, and it is the present status that any process can not be satisfactory.

SUMMARY OF THE INVENTION

Taking an account of the prior arts, the object of this invention is to provide a process for producing at a low cost and economically a polyvinyl chloride paste blending resin for a plastisol and an organisol which has an improving effect in a flowability of a sol as a paste blending resin and provides excellent mechanical properties for a product after molding by heating, and from which a resin can be produced with only a small quantity of coarse particles, a treatment of a waste-water is easy and a quality of a waste-water after treated is good.

After making many efforts to attain the purposes mentioned above, the inventors have accomplished this invention by finding a suspension polymerization by using a suspending agent mainly comprising a specified poly(vinyl alcohol) (hereinafter, referred to as PVA), to thereby obtain a polymer having excellent mechanical properties and characteristics as a paste blending rein, the waste-water of which can easily be treated by activated sludge after an usual flocculating process.

The first aspect of the present invention is a process for producing a polyvinyl chloride paste blending resin comprising polymerizing a vinyl chloride-based monomer by a suspension polymerization in an aqueous medium, wherein as a suspending agent, both (A) and (B) are used in a mixing weight ratio (A)/(B) of 99/1 to 50/50, and a total amount of said (A) and said (B) is 0.1 to 1.0 part by weight based on 100 parts by weight of the vinyl chloride-based monomer, said (A) being a partially hydrolyzed water-soluble poly (vinyl alcohol) having a viscosity at 20° C. of 4% aqueous solution by weight of 20 to 110 cps and the degree of hydrolysis ranging from 86 to 99 mol %, and said (B) being a partially hydrolyzed water-soluble poly(vinyl alcohol) having a viscosity at 20° C. of 4% aqueous solution by weight of 5 to 10 cps and the degree of hydrolysis ranging from 70 to 80 mol %.

The second aspect of the present invention is a process for producing a polyvinyl chloride paste blending resin comprising using with combination of said (A) and said (B) with not more than 0.05 part by weight, based on 100 parts by weight of the vinyl chloride-based monomer, of a hydroxypropyl methylcellulose (C) having a methoxyl content of 18 to 26% by weight, a hydroxypropoxyl content of 4 to 15% by weight and a viscosity at 20° C. of 2% aqueous solution by weight of 3,500 to 35,000 cps as a suspending agent.

DETAILED DESCRIPTION OF THE INVENTION

This invention is characterized in that PVA (A) is used as a main component and PVA (B) is used for combination use. When only PVA (A) is used, a large amount of PVA is needed in order to obtain particles having a desirable diameter of a polyvinyl chloride paste blending resin and a large amount of coarse particles is by-produced in processes of dehydration and drying after polymerization.

The PVA (A) used in this invention has a viscosity at 20° C. of 4% aqueous solution by weight of 20 to 110 cps, preferably 60 to 110 cps, and the degree of hydrolysis ranging from 86 to 99 mol %, preferably 86 to 90 mol %. When the viscosity of an aqueous solution is less than 20 cps, a polymerization process becomes unstable and coagulated-like coarse particles appear. When the viscosity is higher than 110 cps, a diameter of particles can not be small due to a high viscosity of a polymerization system. When the degree of hydrolysis is less than 86 mol %, porous particles are produced, and a bulk density is low and the viscosity of a sol is high. In this specification, a degree of hydrolysis means a molar ratio of a hydrolyzed PVA in the same kind of PVA.

The PVA (B) used in this invention has a viscosity at 20° C. of 4% aqueous solution by weight of 5 to 10 cps, preferably 5 to 7 cps, and the degree of hydrolysis ranging from 70 to 80 mol %. When the viscosity of the aqueous solution of the PVA (B) is outside of the range mentioned above or the degree of hydrolysis is less than 70 mol %, a function thereof as a primary dispersant is small and an effect of a combination use can not be obtained. When the degree of hydrolysis of PVA (B) is over 80 mol %, surface activity is small and it is impossible to reduce a total amount of PVA. A combination use of PVA (B) with PVA (A) causes a total amount of PVA to reduce in obtaining particles having a same diameter and causes a producing amount of coarse particles to reduce in a drying process because a dehydrated resin of a slurry after polymerization is easy to be broken in a drying process.

A mixing ratio of PVA (A)/PVA (B) is in a range of 99/1 to 50/50 by weight, preferably in a range of 97/3 to 80/20 by weight. When the mixing ratio of PVA (A)/PVA (B) is smaller than 50/50, coagulated-like coarse particles occur at a polymerization process and bulk density is low and the viscosity of the sol is high. When this ratio is more than 99/1, it is impossible to lower a total amount of PVA and an amount of coarse particles increases at a drying process. The total amount of PVA (A) and PVA (B) is 0.1 to 1.0 part by weight, preferably 0.1 to 0.5 part by weight based on 100 parts by weight of the vinyl chloride-based monomer. When it is less than 0.1 part by weight, particles having an appropriate diameter as a paste blending resin can not be obtained and an amount of coarse particles at the polymerization process increases, while, in the case of larger than 1.0 part by weight, an amount of coarse particles at the drying process increases.

Further, by combination use of a hydroxypropyl methylcellulose (hereinafter, referred to as HPMC) (C) in the system of combination use of PVA (A) and PVA (B), not only both of amounts of coarse particles produced at the process of polymerization and at the drying process can be lowered but also a resin having a high bulk density and a low viscosity of the sol can be obtained.

HPMC (C) has a methoxyl content ranging from 18 to 26% by weight and a hydroxypropoxyl content ranging from 4 to 15% by weight. The viscosity at 20° C. of 2% aqueous solution by weight is in a range of 3,500 to 35,000 cps, preferably in a range of 12,000 to 35,000 cps. HPMC having a methoxyl content of less than 18% by weight is difficult to be obtained, while in the case of more than 26% by weight, the stabilizing effect at a polymerization process is small and it is impossible to make a bulk density high. HPMC having the hydroxypropoxyl content of out of a range mentioned above is difficult to be obtained. Further, when the viscosity of 2% aqueous solution by weight at 20° C. is less than 3,500 cps, an amount of coarse particles at a polymerization process can not be lowered, while, in a case of larger than 35,000 cps, mechanical properties of a product molded by heat are poor. An amount of an added HPMC (C) is not more than 0.05 part by weight to 100 parts of the vinyl chloride-based monomer. When more than 0.05 part by weight of HPMC (C) is used, COD of the waste-water can not be reduced sufficiently even by waste-water treatments of flocculation and activated sludge.

As examples of the monomer copolymerizable with a vinyl chloride monomer, there may be olefin monomers such as ethylene or propylene; vinyl esters such as vinyl acetate or vinyl stealate; acrylic esters such as methyl acrylate or methyl methacrylate; esters or anhydrides of an acid such as maleic acid or fumaric acid; nitrile monomers such as acrylonitrile; or vinylidene monomers such as vinylidene chloride. An individual or a combination of more than one of these can be used.

As examples of polymerization initiators used in this invention, a conventional initiator generally used in a suspension polymerization of vinyl chloride can be used, and they include organic peroxides such as lauroylperoxide, 3,5,5-trimetylhexanoylperoxide, t-butylperoxypivalate, t-butylperoxyneodecanoate, diisopropylperoxydicarbonate, di-2-ethylhexyl-peroxydicarbonate, acethylcyclohexyl-sulfonylperoxide and the like, and azo compounds such as α,α'-azo-bis-isobuthylonitrile and α,α'-azo-bis-2,4- dimethyl valeronitrile and the like. An individual or a combination of more than one of these can be used.

In this invention, an anionic or nonionic surfactant, pH regulator, chain transfer agent, a polymerization inhibitor and the like may be used singly or with combination of more than one kinds, if needed. The polymerization temperature in this invention is usually in a range of 35 to 70° C., but it is not limited specially. The weight ratio of water/monomer is usually in the range of 0.8 to 3.0, but it is not limited in particular. During polymerization, water can be added intermittently or continuously within a range of a volume reduction accompanied with some progress of polymerization.

A polymer slurry obtained by this invention is made into a product after processes of dehydration and drying. A polymerization waste-water occurred from dehydration process is usually discharged after being made its quality satisfactory to a various regulation for a waste-water by being treated with flocculation and activated sludge. The flocculation treatment is generally performed by adding a flocculant to a waste-water of polymerization under agitation and then, adjusting pH in a neighborhood of 7 (pH=6 to 8) by adding a neutralizing agent, followed by adding a polymer flocculant.

As above-mentioned flocculants, inorganic metal salts such as aluminum chloride, aluminum sulfate, iron (III) chloride and the like, if necessary, or phenolic compounds such as phenol, resorcin, hydroquinone, tannic acid and the like may be used. On the neutralizing agent, there are no special limits, but sodium hydroxide, calcium hydroxide and the like may generally be used. As polymer flocculants, nonionic polymer flocculants such as a polyacrylamide and the like; anionic polymer flocculants such as acrylic amide-acrylic acid salt copolymer and the like; cationic polymer flocculants based on cationic acrylate ester and a liquid amine condensation polymer and the like may be used. One or more kinds of above-mentioned flocculants, neutralizing agents and polymer flocculants are appropriately selected and used depending on a quality of a waste-water.

Micro polymer solids in a waste-water can be removed by the flocculation treatment, but it is difficult to remove a water-soluble polymer suspending agent dissolved in water. Such a water-soluble polymer suspending agent should be removed by a biological activated sludge treatment. For the biological activated sludge treatment, some activated sludge containing microorganisms which can decompose and assimilate the water-soluble polymer can be incubated in an aeration vessel for a desirable time, and then, a general technique can be performed.

COD of the waste-water from a suspension polymerization for a polyvinyl chloride paste blending resin by using a combination of PVA (A) and PVA (B) or a combination of PVA (A), PVA (B) and HPMC (C) as a suspending agent in this invention is about 500 to 2,000 ppm before being treated, and it can be reduced to a level of about 20 ppm after treatments by above-mentioned flocculation and activated sludge.

According to this invention, a polyvinyl chloride paste blending resin, which has an improving effect in a flowability of sol as a paste blending resin and is excellent in mechanical properties of products after heat molding, can be produced at a low cost and economically. Further the process by this invention has the following characteristics: (1) the amount of coarse particles produced in production of a resin is small, (2) a treatment of the waste-water from the process by this invention is easy and the quality of waste-water after a treatment is good.

EXAMPLES FOR CARRYING OUT THE INVENTION

This invention is explained concretely by using the following Examples, but these Examples do not limit this invention in any meanings. Evaluation methods are shown in the following.

1. Average Particle Size

A slurry after polymerization was measured by using MULTISIZER II produced by Coulter Electronics Limited. A particle diameter that the accumulated weight distribution occurrs 50% was regarded as an average particle diameter.

2. Bulk Density

It was evaluated according to JIS K-6721.

3. An Amount of Coarse Particles After Polymerization

One kg of a slurry after polymerization was sieved by using a JIS standard sieve of 120 mesh. An amount of coarse particles after polymerization was shown in percentage by weight of a non-passed amount thereof based on the total amount of polymer.

4. An Amount of Coarse Particles After Drying

After a slurry after polymerization was sieved by using a 120 M (mesh) JIS standard sieve, dehydrated and dried at 50° C., a weight ppm of amount of particle between 60 M and 120 M based on a total polymer was obtained as an amount of coarse particles after drying.

5. Sol Viscosity

After preparing a plastisol by dispersing 60 parts by weight of a paste resin (KANEVINYL PASTE XH27A produced by KANEKA CORPORATION), 40 parts by weight of a paste blending resin, 50 parts by weight of DOP and 2.5 parts by weight of Ba-Zn stabilizers under agitating with a propeller blender and then, degassing, a sol viscosity at 6 rpm and that at 60 rpm were measured by using a Brookfield viscometer after 1 hour and after three days.

6. Preparation of the Cast Film and a Teat of Tensile Strength

A film was prepared by coating a glass plate with above-mentioned plastisol in 0.5 mm thickness and heating at 200° C. for five minutes, and a tensile strength of this film was measured according to JIS K-6723.

7. COD of Waste-water

COD of waste-water after a slurry after polymerization and that after treatments by flocculation and activated sludge were measured according to JIS K-0102.

Example 1

A 300 L polymerization reactor was charged with 140 parts by weight of an aqueous solution, as a suspending agent, of 0.315 part by weight of partially hydrolyzed water-soluble PVA (A) having the degree of hydrolysis of 88 mol % and the viscosity of 4% aqueous solution by weight of 95 cps at 20° C. and 0.035 part by weight of partially hydrolyzed water-soluble PVA (B) having the degree of hydrolysis of 78 mol % and the viscosity of 4% aqueous solution by weight of 6.3 cps at 20° C., and further 0.037 part by weight of di-2-ethylhexylperoxydicarbonate and 0.019 part by weight of 3,5,5-trimethylhexanoyl peroxide as initiators and 0.001 part by weight of a silicon anti-foaming agent were added. After degassing, 100 parts by weight of vinyl chloride monomer was charged into the above-mentioned reactor and then, this mixture was heated up to 54° C. to start polymerization. When the internal pressure of the reactor was down to 3 kg/cm$^2$, unreacted monomer was recovered, and the slurry of polymer thus obtained was dehydrated and dried to give a polyvinyl chloride resin.

As shown in Table 1, an average particle diameter of the obtained resin was 38 μm, bulk density of it was 0.551, sol viscosity of it (6 rpm) were 2,300 cps and 2,380 cps after one hour and after three days, respectively, the tensile strength of it was 19.7 MPa and the bleak elongation of it was 279%. These values showed that the resin thus obtained was quite excellent in quality as a paste blending resin. A very good result that the amount of coarse particles after polymerization and after drying were 0.13% and 1250 ppm, respectively, was also obtained.

COD of waste-water from a polymerization slurry was 580 ppm. To this waste-water added were tannic acid (300 ppm) and aluminum sulfate (500 ppm), followed by neutralizing with calcium hydroxide to be pH 7 and a flocculating treatment was performed by adding polymer flocculant (1 ppm, acrylic amide/sodium acrylate copolymer) to give a clear supernatant fluid. This supernatant fluid was treated with activated sludge containing microorganisms capable of assimilating PVA to give a very good result that COD was 13 ppm.

Examples 2 to 5

Polymerization, evaluations of qualities of resin, measurement of amounts of coarse particles after polymerization and after drying and a treatment of waste-water were performed as the same ways as Example 1 except that 6 compounds described below were used as a suspending agent as shown in the following Examples 2 to 5. The results were shown in Table 1. As a paste blending resin, every polymer obtained was quite excellent in quality, an amount of coarse particles and COD after treatment as seen from Table 1.

PVA (A); viscosity of 4% aqueous solution by weight at 20° C.=95 cps and the degree of hydrolysis=88 mol %.
PVA (A-2); viscosity of 4% aqueous solution by weight at 20° C.=23 cps and the degree of hydrolysis=88 mol %.
PVA (B); viscosity of 4% aqueous solution by weight at 20° C.=6.3 cps and the degree of hydrolysis=78 mol %.
PVA (B-2); viscosity of 4% aqueous solution by weight at 20° C.=6.3 cps and the degree of hydrolysis=71 mol %.
HPMC (C); the methoxyl content=23% by weight, the hydroxypropoxyl content=7% by weight and viscosity of 2% aqueous solution by weight at 20° C.=30,000 cps.
HPMC (C-2); the methoxyl content=23% by weight, the hydroxypropoxyl content=7% by weight and viscosity of 2% aqueous solution by weight at 20° C.=4,500 cps.

Example 2: PVA (A-2)/PVA (B)=0.315/0.035 part by weight.

Example 3: PVA (A)/PVA (B-2)=0.315/0.035 part by weight.

Example 4: PVA (A)/PVA (B)/HPMC (C)=0.297/0.033/ 0.02 part by weight.

Example 5: PVA (A)/PVA (B)/HPMC (C-2)=0.297/0.033/ 0.02 part by weight.

Comparative Example 1

Polymerization, evaluations of qualities, measurement of amounts of coarse particles after polymerization and after drying and a treatment of waste-water were performed as the same ways as Example 1 except that 0.45 part by weight of hydroxypropyl methylcellulose (C-3) having the methoxyl content of 23% by weight, the hydroxypropoxyl content of 7% by weight and the viscosity (at 20° C.) of 2% aqueous solution by weight of 100 cps, was used as a suspending agent. The results wee shown in Table 1. As seen from Table 1, the bulk density of the obtained resin was low, sol viscosity was high, both a tensile strength and a bleak elongation were small, and further COD of waste-water after treatment was as high as 870 ppm. These results showed that the resin obtained was unsatisfactory as a paste blending resin.

Comparative Example 2

Polymerization was performed as the same ways as Example 1 except that 0.45 part by weight of PVA (A) was used as a suspending agent. The results were shown in Table 1. As seen from Table 1, the amount of coarse particles after drying was as high as 3,170 ppm, the bulk density of the obtained resin was low and sol viscosity was high. These results showed that the resin obtained was unsatisfactory as a paste blending resin.

Comparative Example 3

Polymerization was performed as the same ways as Example 1 except that 0.315 part by weight of partially hydrolyzed water-soluble PVA (A-3) having the viscosity (at 20° C.) of 4% aqueous solution of 9 cps and the degree of hydrolysis of 88 mol % was used as a suspending agent instead of 0.315 part by weight of PVA (A). The average particle diameter of the obtained resin was as large as 51 µm, the amount of coarse particles after polymerization was as high as 0.56%, the bulk density was low and sol viscosity was high. These results showed that the resin obtained was unsatisfactory as a paste blending resin.

Comparative Example 4

Polymerization was performed as the same ways as Example 1 except that 0.315 part by weight of partially hydrolyzed water-soluble PVA (A-4) having the viscosity (at 20° C.) of 4% aqueous solution of 48 cps and the degree of hydrolysis of 80 mol % was used as a suspending agent instead of 0.315 part by weight of PVA (A). As a result, the bulk density was as low as 0.503, and sol viscosity was high. These results showed that the resin obtained was unsatisfactory as a paste blending resin.

Comparative Example 5

Polymerization was performed as the same ways as Example 4 except that 0.02 part by weight of HPMC (C-3), which was used in Comparative Example 1, was used as a suspending agent instead of 0.02 part by weight of HPMC (C). The amount of coarse particles after polymerization was as high as 0.78%, the bulk density was as low as 0.501 and sol viscosity was high. These results showed that the resin obtained was unsatisfactory as a paste blending resin.

Comparative Example 6

Polymerization was performed as the same ways as Example 1 except that 0.07 part by weight of PVA (A) was used as a suspending agent. Though COD of waste-water from the slurry after polymerization was 45 ppm, which was a good result, the average particle diameter of the obtained resin was 125 µm, which was nearly the same as that of usual polyvinyl chloride resin, and the amount of non-passed of 120 M sieve was as much as 49.5%. These results showed that the resin obtained was quite unsatisfactory as a paste blending resin.

TABLE 1

|  | Example | | | | | Comparative Example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Suspending agent | | | | | | | | | | | |
| PVA (A) | 0.315 | — | 0.315 | 0.297 | 0.297 | — | 0.45 | — | — | 0.297 | 0.07 |
| PVA (A-2) | — | 0.315 | — | — | — | — | — | — | — | — | — |
| PVA (A-3) | — | — | — | — | — | — | — | 0.315 | — | — | — |
| PVA (A-4) | — | — | — | — | — | — | — | — | 0.315 | — | — |
| PVA (B) | 0.035 | 0.035 | — | 0.033 | 0.033 | — | — | 0.035 | 0.035 | 0.033 | — |
| PVA (B-2) | — | — | 0.035 | — | — | — | — | — | — | — | — |
| HPCM (C) | — | — | — | 0.02 | — | — | — | — | — | — | — |
| HPCM (C-2) | — | — | — | — | 0.02 | — | — | — | — | — | — |
| HPCM (C-3) | — | — | — | — | — | 0.45 | — | — | — | 0.02 | — |
| Average particle diameter ($\mu$m) | 38 | 41 | 40 | 88 | 40 | 40 | 42 | 51 | 40 | 42 | 125 |
| Bulk density (g/cc) | 0.551 | 0.545 | 0.560 | 0.567 | 0.555 | 0.485 | 0.525 | 0.515 | 0.503 | 0.501 | 0.504 |
| Amount of coarse particles after polymerization (%) | 0.13 | 0.15 | 0.18 | 0.10 | 0.11 | 0.12 | 0.19 | 0.56 | 0.25 | 0.78 | 49.5 |
| Amount of coarse particles after drying (ppm) | 1,250 | 1,290 | 1,210 | 1,100 | 1,170 | 1,150 | 3,170 | 1,450 | 980 | 1,150 | — |
| Viscosity of the sol (cps) | | | | | | | | | | | |
| 1 hr 6 rpm | 2,300 | 2,350 | 2,200 | 2,100 | 2.280 | 3,250 | 2,630 | 2,720 | 2,840 | 2,850 | — |
| 60 rpm | 2,280 | 2,330 | 2,180 | 2,080 | 2,260 | 3,210 | 2,600 | 2,690 | 2,810 | 2,820 | — |
| 3 days 6 rpm | 2,380 | 2,430 | 2,260 | 2,170 | 2,350 | 3,370 | 2,720 | 2,820 | 2,940 | 2,940 | — |
| 60 rpm | 2,340 | 2,400 | 2,230 | 2,140 | 2,320 | 3,310 | 2,670 | 2,770 | 2,880 | 2,890 | — |
| Tensile strength test | | | | | | | | | | | |
| Tensile strengh (MPa) | 19.7 | 20.0 | 20.1 | 19.2 | 19.5 | 14.8 | 19.5 | 20.2 | 21.0 | 19.6 | — |
| Bleak elongation (%) | 279 | 280 | 283 | 270 | 275 | 193 | 275 | 282 | 285 | 273 | — |
| COD of waste-water (ppm) | | | | | | | | | | | |
| Before treatment | 580 | 560 | 550 | 675 | 690 | 1,986 | 1,350 | 740 | 360 | 710 | 45 |
| After treatment | 13 | 12 | 11 | 18 | 19 | 870 | 20 | 18 | 10 | 21 | — |

What is claimed is:

1. A process for producing a polyvinyl chloride paste blending resin comprising polymerizing a vinyl chloride monomer or a mixture of a vinyl chloride monomer and a monomer copolymerizable therewith by a suspension polymerization in an aqueous medium, wherein as a suspending agent, both (A) and (B) are used in a mixing weight ration (A)/(B) of 99/1 to 50/50, and a total amount of said (A) and said (B) is 0.1 to 1.0 parts by weight based on 100 parts by weight of the vinyl chloride monomer or the mixture of a vinyl chloride monomer and a monomer copolymerizable therewith, said (A) being a partially hydrolyzed water-soluble poly(vinyl alcohol) having a viscosity at 20° C. of 4% aqueous solution by weight of 20 to 110 cps and the degree of hydrolysis of 86 to 99 mol %, and said (B) being a partially hydrolyzed water-soluble poly(vinyl alcohol) having a viscosity at 20° C. of 4% aqueous solution by weight of 5 to 10 cps and the degree of hydrolysis of 70 to 80 mol %, and wherein not more than 0.05 parts by weight, based on 100 parts by weight of the vinyl chloride monomer or the mixture of a vinyl chloride monomer and a monomer copolymerizable therewith, of a hydroxypropyl methylcellulose (C) having a methoxyl content of 18 to less than 26% by weight, a hydroxypropoxyl content of 4 to 15% by weight and a viscosity at 20° C. of 2% aqueous solution by weight of 3500 to 35,000 cps is further used in combination as a suspending agent.

2. The process of claim 1 wherein the hydroxypropyl methylcellulose has a viscosity at 20° C. of 2% aqueous solution by weight of 12,000 to 35,000 cps.

3. The process of claim 1 wherein the mixing weight ratio (A)/(B) is 97/3 to 80/20.

4. The process of claim 1 wherein the total amount of (A) and (B) is 0.1 to 0.5 parts by weight based on 100 parts by weight of the vinyl chloride monomer or the mixture of a vinyl chloride monomer and a monomer copolymerizable therewith.

5. The process of claim 1 wherein the paste blending resin has a particle diameter of 20 to 60 $\mu$m.

6. The process of claim 2 wherein the paste blending resin has a particle diameter of 20 to 60 $\mu$m.

* * * * *